(12) United States Patent
Castellino et al.

(10) Patent No.: US 10,071,340 B2
(45) Date of Patent: Sep. 11, 2018

(54) FILTER BAG ASSEMBLY

(71) Applicants: HALDOR TOPSØE A/S, Kgs. Lyngby (DK); FLSMIDTH A/S, Valby (DK)

(72) Inventors: Francesco Castellino, Frederiksberg (DK); Jorn Moller Rasmussen, Virum (DK); Iver Blankenberg Schmidt, Skorping (DK)

(73) Assignee: FLSmidth A/S (DK)

( * ) Notice: Subject to any disclaimer, the term of this patent is extended or adjusted under 35 U.S.C. 154(b) by 171 days.

(21) Appl. No.: 15/126,218

(22) PCT Filed: Mar. 20, 2015

(86) PCT No.: PCT/EP2015/055950
§ 371 (c)(1),
(2) Date: Sep. 14, 2016

(87) PCT Pub. No.: WO2015/140305
PCT Pub. Date: Sep. 24, 2015

(65) Prior Publication Data
US 2017/0080387 A1    Mar. 23, 2017

(30) Foreign Application Priority Data
Mar. 21, 2014 (DK) .................................. 2014 00160

(51) Int. Cl.
    *B01D 53/86*      (2006.01)
    *B01D 46/02*      (2006.01)
    (Continued)

(52) U.S. Cl.
    CPC ..... *B01D 53/8631* (2013.01); *B01D 46/0024* (2013.01); *B01D 46/02* (2013.01);
    (Continued)

(58) Field of Classification Search
None
See application file for complete search history.

(56) References Cited

U.S. PATENT DOCUMENTS

| 4,244,718 A | | 1/1981 | Noddin | |
|---|---|---|---|---|
| 5,417,855 A | * | 5/1995 | Gershenson | ........... B01D 29/27 210/232 |

(Continued)

FOREIGN PATENT DOCUMENTS

| DE | 19720981 A1 | * | 11/1998 | ........... B01D 53/885 |
|---|---|---|---|---|
| DE | 19720981 A1 | | 11/1998 | |
| JP | 04363116 A | | 12/1992 | |
| JP | 08196830 A | | 8/1996 | |
| JP | 10230119 A | | 9/1998 | |

OTHER PUBLICATIONS

Kwetkus, A. DE19720981A1—translated document (Year: 1998).*

(Continued)

*Primary Examiner* — Walter D. Griffin
*Assistant Examiner* — Jelitza M Perez
(74) *Attorney, Agent, or Firm* — Matthew R. Weaver

(57) ABSTRACT

Filter bag assembly for use in cleaning of process gas comprising an outer tubular filter bag and one or more inner tubular filter bags separately arranged within the outer tubular filter bag, and said one or more inner tubular filter bags also separately arranged within each other, the one or more inner tubular filter bags and the outer tubular filter bags having an open end and a closed end, and at least one of the inner tubular filter bags and/or the outer tubular filter bag being provided with catalytically active material.

25 Claims, 2 Drawing Sheets

Figure 1:
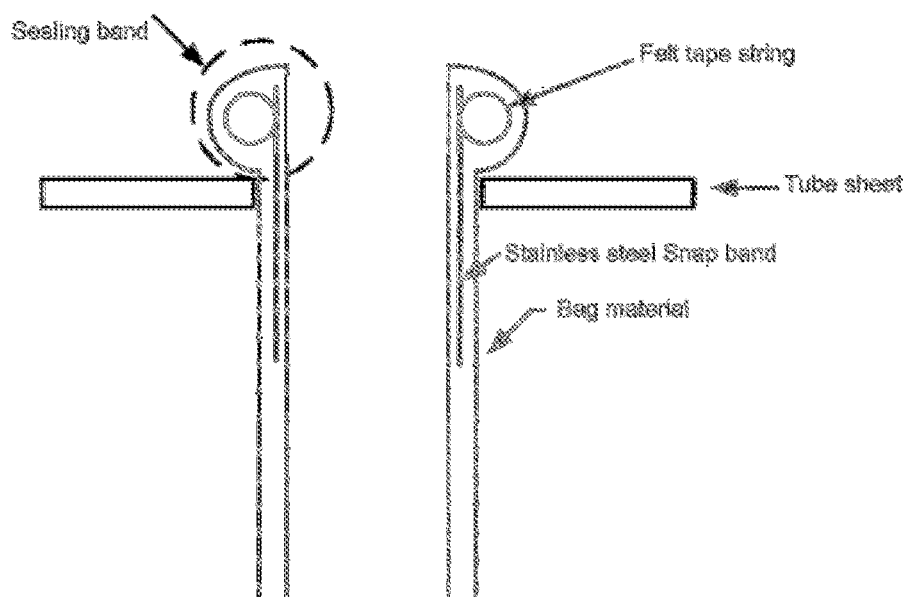

(51) Int. Cl.
*B01D 46/00* (2006.01)
*B01D 53/75* (2006.01)
*B01D 53/88* (2006.01)
*B01J 23/22* (2006.01)
*B01J 23/648* (2006.01)

(52) U.S. Cl.
CPC ............ *B01D 53/75* (2013.01); *B01D 53/86* (2013.01); *B01D 53/88* (2013.01); *B01J 23/22* (2013.01); *B01J 23/6482* (2013.01); *B01D 2255/1023* (2013.01); *B01D 2255/20707* (2013.01); *B01D 2255/20723* (2013.01); *B01D 2257/404* (2013.01); *B01D 2257/502* (2013.01); *B01D 2257/70* (2013.01); *B01D 2257/708* (2013.01); *B01D 2258/0233* (2013.01); *B01D 2258/0283* (2013.01); *B01D 2258/0291* (2013.01); *B01D 2271/02* (2013.01)

(56) References Cited

U.S. PATENT DOCUMENTS

| 5,540,897 A | 7/1996 | Chu et al. |
| 2010/0095843 A1 | 4/2010 | Gebert |
| 2014/0020345 A1 | 1/2014 | Schwarzl |

OTHER PUBLICATIONS

Fino D et al., A multifunctional filter for the simultaneuous removal of fly-ash and NOx from incinerator flue gasses, XP00468448, Nov. 1, 2004, 5329-5336, 59, No. 22-23, Chemical Engineering Science, Oxford GB.

The International Search Report and Written Opinion dated Jun. 17, 2015, 12 pages.

\* cited by examiner

FILTER BAG ASSEMBLY

The present invention relates to a filter bag assembly comprising multiple fabric filter bags coaxially arranged within an outer filter bag. More particularly, the invention provides a filter assembly comprising an outer tubular filter bag and within the outer filter bag, one or more inner tubular filter bags are separately installed within the outer filter bag and within each other for the removal of dust and particulate matter in a process gas. At least one of the filter bags is catalyzed filter bag for the removal of harmful components contained in the process gas. The filter bag assembly is in particular useful in the cleaning of process or raw gas from industrial processes involving combustion, like the production of minerals, cement, waste incineration, or from coal fired boilers.

Fabric filters in form of filter bags are extensively used in many industries for removal of particulate matter from process gases. They are one of the most efficient types of dust collectors available and can achieve collection efficiencies of more than 99% for particulates. The bags can be made from various woven or felted materials or mixtures thereof comprising natural fibres, synthetic fibres, or other fibres such as glass, ceramic or metallic fibres.

The high particulate removal efficiency of fabric filters is partly due to the dust cake formed on the surfaces of the filter bags and partly due to the filter bag composition and production quality as well as the quality of the fabric filter construction itself. The fabric provides a surface on which dust particulates collect. Due to the composition of the fibers constituting the filter bags, these are normally operated at temperatures lower than 250° C.

The particle-containing process gas very often contains a plurality of pollutants, e.g. $NO_x$, volatile organic compounds (VOC), $SO_2$, CO, Hg, $NH_3$, dioxins and furans, in concentrations that have to be reduced depending on local legislation. For this purpose, several conventional methods are available. In all cases additional units up/downstream the fabric filter bags have to be installed and operated.

The abatement of gaseous contaminants like $NO_x$, VOC, dioxins and furans can be effectively carried out by contact with a catalyst. In particular, vanadium oxide-based catalysts are commonly used catalysts for $NO_x$ reduction by selective reduction of $NO_x$ with $NH_3$ in stationary and automotive applications.

The general object of the present invention is to combine mechanical removal of dust and particulate matter and catalytic removal of gaseous contaminants, which are contained in industrial process gasses by means of a fabric filter bag assembly product.

Thus, this invention provides a filter bag assembly for use in cleaning of process gas comprising an outer tubular filter bag and one or more inner tubular filter bags separately arranged within the outer tubular filter bag, and said one or more inner tubular filter bags also separately arranged within each other, the one or more inner tubular filter bags and the outer tubular filter bags having an open end and a closed end, and at least one of the inner tubular filter bags and/or the outer tubular filter bag being provided with catalytically active material.

Further details of the filter bag assembly of the invention can be found in the following description of the invention, the figure and the dependent claims.

The term "outer bag" as used herein before and in the following description and in the appended claims, refers to the filter bag through which the process gas passes first and the term "inner bag" refers to the filter bag(s) through which the process gas passes subsequently after having passed through the outer bag.

The catalytically active material on different filter bags of the filter bag assembly according to the invention can be selected from different catalyst compositions, so that catalytically active material in an upstream filter bag in flow direction of the process gas through the filter assembly is active in reducing the content of a first gaseous component in the process gas, said first component reducing the catalytic activity of the catalytically active material of a downstream filter bag in flow direction of the process gas and said downstream active filter bag is active in reducing the content of a second gas component in the process gas.

The catalytically active material in at least one of the one or more tubular inner filter bags and/or the outer tubular filter bag is provided with a catalyst composition comprising a vanadium oxide and titania.

The term "a vanadium oxide" or "vanadium oxide" refers to:
Vanadium(II)oxide (vanadium monoxide), VO; or
vanadium(III)oxide (vanadium sesquioxide or trioxide), $V_2O_3$; or
vanadium(IV)oxide (vanadium dioxide), $VO_2$; or
vanadium(V)oxide (vanadium pentoxide), $V_2O_5$.

Preferably, vanadium oxide for use in the invention comprises or consists of vanadium(V)oxide (vanadium pentoxide), $V_2O_5$.

The term "titania" refers to titanium dioxide ($TiO_2$).

The catalytically active material can further comprise palladium in metallic and/or oxidic form.

These catalysts are active both in the removal of hydrocarbons (VOC) and carbon monoxide and in the removal of NOx by the SCR reaction with NH3.

These catalysts are preferred for the following reasons. The Pd/V/Ti catalyst has i) dual functionality (removal of NOx and removal of VOC, volatile organic compounds); ii) a S-tolerance; and iii) a lower $SO_2$ oxidation activity compared to other catalyst compositions, e.g. Pt-based catalysts.

It is known that the oxidation activity of a Pd-containing catalyst is reduced by the presence of few ppm of NH3. Employing the V/Ti catalyst in the outer or in the outer and the first inner bag reduces or eliminates the content of NH3, which is present in excess in the process gas from cement plants by the SCR reaction with NOx, while the VOC are oxidized to a mixture of CO and $CO_2$. It is also known that, besides being an active catalyst in the NH3-SCR of NOx, vanadium oxide is also an active oxidation catalyst. In comparison to the precious metal catalysts, like the Pd catalyst, the vanadium oxide catalyst is less selective in the formation of $CO_2$ and some amounts of CO are produced during the oxidation reactions. CO cannot be oxidized to $CO_2$ at a feasible reaction rate by contact with the vanadium oxide catalyst, but requires presence of a noble metal catalyst, e.g. Pd. Thus, if NH3 is present in the gas, then it preferred to catalyze the outer filter bag with a V/Ti catalyst and at least one of the inner bags is catalyzed with a Pd/V/Ti catalyst if CO is present in the process gas or formed by the catalytically oxidation of VOC in the outer bag.

As an example, when ammonia and VOC containing process gas is passed through the outer bag of a filter bag assembly loaded with a vanadium oxide-based catalyst, ammonia is removed by $NH_3$-SCR of NOx from the gas prior to its contact with an inner bag. Some amount of CO is formed after direct contact with the V/Ti catalyst during passage through the outer bag by incomplete oxidation of VOC. By loading an inner bag with a Pd/V/Ti catalyst, CO and a remaining amount of VOC is then effectively oxidized to $CO_2$. In this way a minimum load of expensive noble metals in the inner filter bags can be achieved.

Additionally, when employing a Pd/V/Ti catalyst the catalyzed filter bags are sulfur resistant, i.e. not subjected to sulfur deactivation. The Pd/V/Ti catalyst additionally reduces the amount of $SO_3$ formed by oxidation of $SO_2$. If $H_2S$ is also present in the process gas entering the filter bag assembly, it will also be oxidized to SO2 on both the V/Ti and Pd/V/Ti catalyst.

Thus, in a specific embodiment of the invention, the catalytically active material in the outer tubular filter bag comprises vanadium oxide and titania.

In further a specific embodiment of the invention the catalytically active material in at least one of the one or more inner tubular filter bags comprises vanadium oxide and titania and palladium in metallic and/or oxidic form.

The catalytically active material is applied on the filter bag(s) in the fabric material on fibres of the material by impregnation with a slurry containing the catalytically active material in form of titania micro-particles and the precursors of the active materials, i.e. salts of vanadium and palladium. The impregnation can then be carried out by dipping the filter bags into the slurry or spraying the solution on the filter bags. Due to the potential hydrophobicity of the filter bag fabrics, surfactants may be added to the slurry for facilitating the penetration of the liquid into the fabric material. Once impregnated, the bags are subsequently dried and heated up to the required temperature for the decomposition of all precursors and activation of the catalyst.

Alternatively, the catalyst can be prepared, dried and activated in form of a powder prior to the impregnation step. A slurry can then be prepared with the active catalyst powder and the filter bags impregnated as described above. By means of the latter procedure, the impregnated bags need only to get dried before being used.

In an embodiment of the invention, the filter bag assembly comprises at least a first and second inner tubular filter bag.

It is preferred that the catalytically active material in the outer tubular filter bag comprises a vanadium oxide and titania and the catalytically active material in the first inner tubular filter bag comprises a vanadium oxide and titania.

It is further preferred that the catalytically active material in the outer tubular filter bag comprises a vanadium oxide and titania and the catalytically active material in the second inner filter bag comprises, a vanadium oxide, titania and palladium in metallic and/or oxidic form.

The tubular outer and subsequent series of inner filter bags are made from porous filter medium of material suitable for different process conditions. The bag material is sewn or welded into the tubular filter bag.

Preferably, the outer tubular filter bag and the one or more inner tubular filter bags are made of woven fabric or needle felt of individual organic or inorganic fibers.

The catalytically active material is supported on the woven fabric or needle felt.

The most common filter bag material used in e.g. cement kiln applications is glass fibre material, optionally with a thin polymer membrane on the outside of the outer bag that faces the process gas.

The polymeric membrane can be made of polytetrafluoroethylene.

The membrane protects the catalyst from contamination by catalyst poisons contained in particular matter.

In order to allow easy installation of the filter bags in a tube sheet, the outer tubular bag and each of the inner tubular filter bags are provided with a top cuff forming a hollow casing at the open end of the bags and holding one or more stainless steel snap bands, onto which a felt string is adhered. The top cuff together with the snap band and the string form a sealing band around the open end of the filter bags, as shown in FIG. 1 of the drawings. The sealing band shall be sized to fit around the full circumference of the snap band. More than one sealing bands can be arranged on glass bags.

The top cuff of the outer tubular filter bag holds an upper and optionally an additionally lower sealing band.

The upper sealing band is arranged on the outer tubular filter bag at the open end of the bag above the upper side of the tube sheet and the optional lower sealing band below the tube sheet.

When the outer tubular filter bag is installed in the tube sheet, the sealing band ensures that the bag is mounted securely on the tube sheet and provides an effective seal between the dirty side and the clean side of the filter.

In the tubular filter bag assembly according to the invention a first inner tubular bag having a smaller diameter than the outer bag is separately arranged inside the outer bag.

The next inner tubular bag with diameters less than the previous tubular bags can then be separately arranged within the previous inner bag. Optionally, more than two inner bags may be arranged in the filter bag assembly according to the invention in the same manner as the first and second inner tubular bags.

Each of the inner bags is provided with only one sealing band.

The filter bags are fitted in the filter bag assembly one by one. The outer bag snaps into the tube sheet, while the first inner bag is fastened by snapping its sealing band on to the top of the upper sealing band of the outer bag, and a second inner bag by snapping its sealing band on to the sealing band of the first inner bag. Optionally further inner bags are installed in same manner. Thus, an advantage of the filter bag assembly design according to the invention is inter alia that all the tubular filter bags can be easily removed and replaced individually. Thus, by this arrangement it is possible only to replace the filter bags which under-performs. Furthermore, even if all filter bags are to be replaced, the reuse and recycling is optimized since the materials on the specific bags can be treated individually in an optimal way.

When operating the tubular filter bag assembly according to the invention, the raw process gas having a high dust load containing enters the inlet manifold of a filter bag casing hosting a plurality of the tubular filter assemblies described. The gas passes through a gas distribution screen arrangement and is distributed between the filter assemblies in the filter bag area. Because of the low gas velocity in in this area, a portion of dust drops out before it reaches the surface of the tubular filter assemblies. At the inlet of the tubular filter bag areas the gas path is expanded, the gas velocity decreases and part of the dust drops out into bottom hoppers, located below the filter bag areas.

The dust is deposited on the outer surface of the outer tubular filter facing the dirty process gas flow bag and forms a filter cake, while the gas passes through the outer bag and the inner bag(s) of the filter bag assembly into a clean air section next to the filter bag area. The pressure difference which allows the air to pass through the filter bags is generated by an ID-fan located downstream the fabric filter.

The membrane on the outer filter bag enhances formation of a filter cake formed on the outer filter bag side facing the process gas. Particles are not able to penetrate the fabric/fibers of the outer filter bag, thus the catalysts loaded on the outer bag and/or the inner bag(s) are effectively protected by potential catalyst poisons present in the particles contained in the process gas.

In e.g. cement production processes, the process gas entering the filter house may contain different types of contaminants including VOC, NOx, $NH_3$ and $SO_2$. By means of the filter bag assembly according to the invention with at least two or more tubular filter bags arranged separately inside within each other, each filter bag can be loaded with a different catalyst, which provides the possibility for effective catalytically removal of different contaminants in different filter bags of the assembly each catalyzed with an active catalyst for the removal of specific contaminants.

The pressure drop across the filter bags will gradually increase as the amount of filter cake on the outer side of the filter assembly increases. Therefore, dust must be removed from the bags at regular intervals.

This cleaning operation is performed sequentially with different rows of filter bags being cleaned in a preset sequence. The sequence is automatically controlled by a filter controller. The cleaning is effected in dependency of the differential pressure between the raw gas manifold and a clean gas manifold or periodically forced with certain frequencies e.g. on an hourly basis.

The filter bags are cleaned by pulse injection of compressed-air (pulse jet cleaning) downwards through the bags in direction opposite of the cleaned gasses flowing upwards through the bags. The bags are inflated so that the dust layer is released from the bags and drops into a bottom hopper where it is removed by the dust discharge system. The cleaned gas passes through the bags, into a clean air plenum before being released into the atmosphere.

The cleaning procedure has no effect on the catalyst(s) load on the filter bags since during the cleaning the cleaning air flow through the filter bags is very limited.

To support the filter bags, a cage formed of round steel wires or bars is installed inside the innermost tubular filter bag. The cage is designed to support the fabric of the filter bags evenly and restrict flexing and abrasion of the filter bags whilst allowing optimum dust release during the cleaning sequence.

The cage can be in form of a single piece or a multi-piece construction comprising a number of vertical wires (stringers), evenly spaced about the circumference. The vertical wires are preferably attached to horizontal bracing rings placed at appropriate intervals along the cage length.

A venturi can be installed at top of the cage. The venturi can be mounted within the cage or located on top of the cage. The venturi is designed to enhance the effect of the pulse cleaning of the filter bag and save cleaning air consumption. The bottom part of the venturi is formed as a base ring which surrounds all of the sealing bands installed in the tube sheet and on each of the filter bags and protects the sealing bands. The ring rests on the tube sheet and carries the weight of the cage.

The invention will be disclosed in more detail by reference to the drawings, in which FIG. 1 shows the arrangement of a sealing band on top of a filter bag according to an embodiment of the invention as described above; and FIG. 2 shows a cross-section of a filter the top part of a filter bag assembly according a specific feature of the invention.

Figure 2:
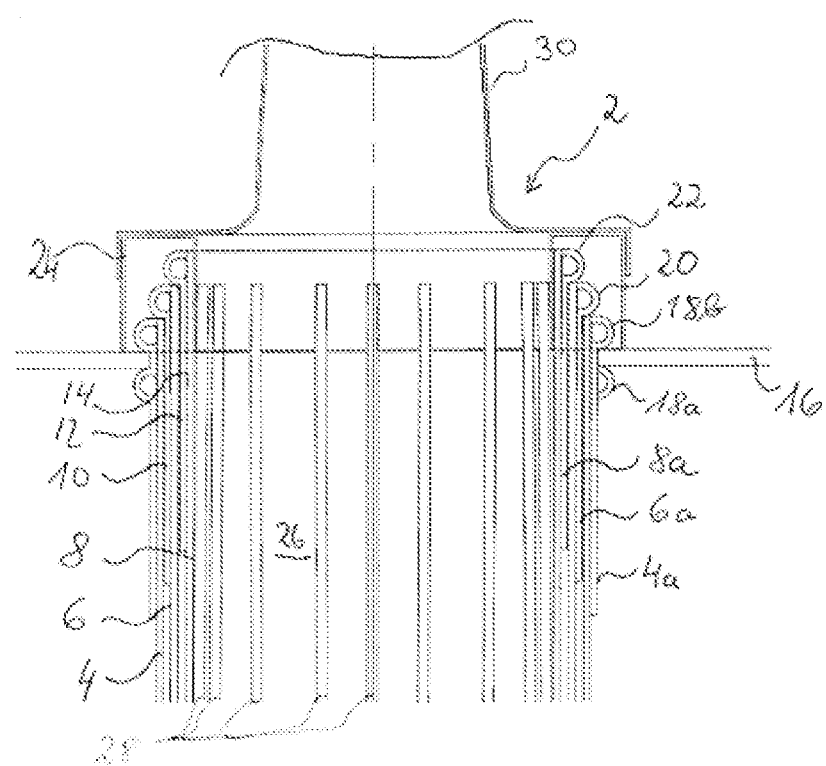

Referring now to FIG. 2, a filter bag assembly 2 according to a specific embodiment of the invention comprises an outer tubular filter bag 4, a first inner tubular filter bag 6 coaxially arranged within outer filter bag 4, and a second inner filter bag 8 coaxially arranged within the first inner tubular filter bag 6. Each of the filter bags is provided with a top cuff 4a, 6a and 8a, respectively. Each of the top cuffs 4a, 6a, 8a surrounds a steel snap band 10, 12 and 14, respectively. Outer filter bag 4 is mounted and suspended in a tube sheet 16 by means of upper sealing band 18b, optionally additionally by means of a lower sealing band 18a. First inner filter bag 6 is coaxially arranged within outer filter bag 4 and suspended from the open end of outer filter bag 4 by means of sealing band 20 of filter bag 6 and upper sealing band 18b in outer filter bag 4. Second inner filter bag 8 is coaxially arranged within first inner filter bag 6 and suspended from top of first inner filter bag 6 by means of sealing band 22 of inner bag 8. The sealing bands are surrounded by a base ring 24 for the protection of the sealing bands. Base ring 24 rests on tube sheet 16 and serves at the same time as anchor for cage 26. Cage 26 supports second inner filter bag 8. Cage 26 consists of a number of vertical steel wires or bars 28, which ensure bag 8 from collapsing and from abrasion during operation and pulse cleaning. Pulse cleaning is enhanced by means of venturi 30 mounted on top of base ring 24.

EXAMPLE 1

The following example illustrates the performance obtainable with one single bag impregnated with the V/Ti catalyst in the oxidation of toluene. The inlet gas contained 40 ppm,dry toluene, 19% vol $O_2$, 8% vol $H_2O$.

Toluene oxidation on a V/Ti impregnated bag

| Temp. °C. | Face vel. m/min | Conversion of Toluene % | CO, out ppm, wet |
|---|---|---|---|
| 220 | 1.28 | 59 | 17 |
| 240 | 1.34 | 85 | 35 |

As apparent from the table above, 85% of toluene was converted at 240° C. The CO emission at the same temperature was equal to 35 ppm,wet.

EXAMPLE 2

The following example illustrates the CO oxidation performance of one filter bag impregnated with the Pd/V/Ti catalyst. The tests were conducted with a gas containing around 150 ppm,wet CO, 19% $O_2$ and 8% $H_2O$.

CO oxidation on a Pd/V/Ti impregnated bag

| Temp. °C. | Face vel. m/min | CO, in ppm, wet | CO, out ppm, wet | Conversion of CO % |
|---|---|---|---|---|
| 220 | 1.28 | 148 | 36.5 | 75 |
| 240 | 1.35 | 157 | 4 | 97 |

At 240° C., 97% of the CO was oxidized to $CO_2$.

By combining the performance of the filter bags reported in EXAMPLE 1 and EXAMPLE 2, it is possible to conclude that only 1 ppm CO is emitted by a filter bag assembly constituted by the two bags of EXAMPLE 1 and EXAMPLE 2.

What is claimed is:

1. A filter bag assembly for use in cleaning of process gas comprising an outer tubular filter bag and one or more inner tubular filter bags separately arranged within the outer tubular filter bag, and said one or more inner tubular filter bags also separately arranged within each other, the one or more inner tubular filter bags and the outer tubular filter bags having an open end and a closed end, and at least one of the inner tubular filter bags and/or the outer tubular filter bag comprising a catalytically active material, and wherein a first of the one or more inner tubular filter bags is arranged within the outer tubular filter bag by means of a sealing band at the open end of said first inner tubular filter bag.

2. The filter bag assembly of claim 1, wherein the catalytically active material in the outer tubular filer bag in flow direction of the process gas through the filter assembly is capable of actively reducing the content of a first component in the process gas, said first component being able to reduce a catalytic activity of the catalytically active material of one or more downstream inner tubular filter bags in flow direction of the process gas and said downstream filter bag(s) is capable of actively reducing the content of a second component in the process gas.

3. The filter bag assembly of claim 2, wherein the catalytically active material in the the outer tubular filer bag comprises a vanadium oxide and titania.

4. The filter bag assembly of claim 2, wherein the catalytically active material in the one or more downstream inner tubular filter bags comprises a vanadium oxide, titania and palladium in metallic and/or oxidic form.

5. The filter bag assembly of claim 1, wherein the catalytically active material in at least one of the said one or more inner tubular filter bags and/or said outer tubular filter bag is provided with a catalyst composition comprising a vanadium oxide and titania.

6. The filter bag assembly of claim 5, wherein the catalytically active material furthermore comprises palladium in metallic and/or oxidic form.

7. The filter bag assembly of claim 1, wherein the catalytically active material in the outer tubular filter bag comprises a vanadium oxide and titania.

8. The filter bag assembly of claim 1, wherein the catalytically active material in at least one of the one or more inner tubular filter bags comprises a vanadium oxide, titania and palladium in metallic and/or oxidic form.

9. The filter bag assembly according to claim 1, comprising at least a first and second inner tubular filter bag.

10. The filter bag assembly of claim 9, wherein the catalytically active material in the first inner tubular filter bag comprises a vanadium oxide and titania.

11. The filter bag assembly of claim 9, wherein the catalytically material in the second inner tubular filter bag comprises a vanadium oxide, titania and palladium in metallic and/or oxidic form.

12. The filter bag assembly of claim 1, wherein the outer tubular filter bag and the one or more inner tubular filter bags are made of woven fabric or needle felt of individual organic or inorganic fibers.

13. The filter bag assembly of claim 12, wherein the catalytically active material is supported on the individual organic or inorganic fibers of the individual tubular filter bags.

14. The filter bag assembly of claim 1, wherein the outer tubular filter bag is coated with a polymeric membrane on an outer side of said outer tubular filter bag facing the process gas.

15. The filter bag assembly of claim 14, wherein the polymeric membrane consists of polytetrafluoroethylene.

16. The filter bag assembly of claim 1, wherein the outer tubular filter bag and the one or more inner tubular filter bags are provided with a top cuff forming a hollow casing at the open end and holding one or more steel snap bands, onto each of said steel snap bands being adhered a string forming together with the top cuff and the snap band the sealing band.

17. The filter bag assembly of claim 16, wherein the outer tubular filter bag is provided with an upper sealing band.

18. The filter bag assembly of claim 17, wherein the outer tubular filter bag is additionally provided with a lower sealing band.

19. The filter bag assembly according to claim 17, wherein the outer tubular filter bag is mounted in a tube sheet by means of the upper sealing band.

20. The filter bag assembly according to claim 18, wherein the outer tubular filter bag is mounted in a tube sheet by means of the upper and lower sealing band.

21. The filter bag assembly of claim 16, wherein a second of the one or more inner tubular filter bags is arranged within the first inner tubular filter bag by means of the sealing band at the open end of said second inner tubular filter bag.

22. The filter bag assembly of claim 21, wherein an innermost of the one or more inner tubular filter bags is supported by means of a cage arranged inside said innermost inner tubular filter bag.

23. The filter bag assembly of claim 22, wherein a venturi is fastened at top of the cage at the open end of the innermost inner filter bag.

24. The filter bag assembly of claim 23, wherein a bottom part of the venturi is fastened to the cage by means of a base ring.

25. The filter assembly of claim 24, wherein the base ring surrounds the sealing bands.

* * * * *